Jan. 30, 1968         J. H. ANDRESEN, JR         3,365,928
                      PITOT STATIC TESTER
Original Filed May 17, 1962                   3 Sheets-Sheet 3

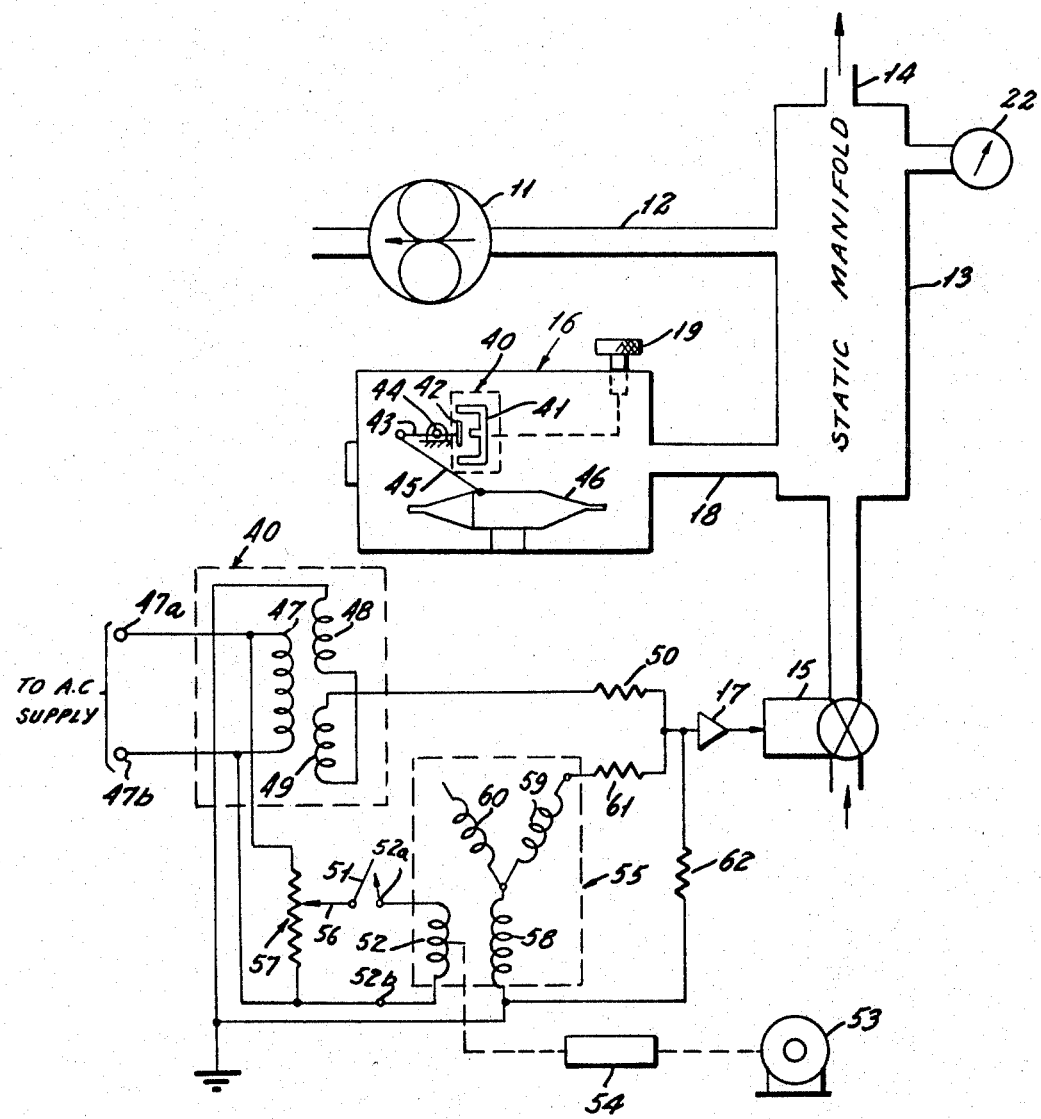

INVENTOR.
JOHN H. ANDRESEN, JR.
BY
OSTROLENK, FABER, GERB & SOFFEN
ATTORNEYS though not necessarily greater than ambient. Additional electronic servo means operates another control valve to maintain a selected differential pressure between the static and pitot manifolds.

United States Patent Office 3,365,928
Patented Jan. 30, 1968

3,365,928
PITOT STATIC TESTER
John Henry Andresen, Jr., Hewitt, N.J., assignor to Intercontinental Dynamics Corporation, Englewood, N.J., a corporation of New York
Original application May 17, 1962, Ser. No. 196,042, now Patent No. 3,243,990, dated Apr. 5, 1966. Divided and this application Aug. 23, 1965, Ser. No. 481,821
8 Claims. (Cl. 73—4)

ABSTRACT OF THE DISCLOSURE

An apparatus for testing and calibrating air speed indicators, machmeters, altimeters etc. is provided with a static manifold and a pitot manifold for appropriate connection to the indicator to be tested. A single pump is connected between the manifolds to maintain the pitot manifold at a higher pressure than the static manifold. Means are provided to bleed air from the atmosphere into the static manifold, from the pitot to the static manifold and from pump output to the atmosphere, each in a controlled manner to maintain the pressures therein at the proper level for testing purposes.

---

This application is a division of copending application Serial No. 196,042, filed May 17, 1962 and relating to instrument testing devices having variable pressure systems and is an improvement over the device set forth in U.S. Patent No. 3,089,331, issued May 14, 1963.

The testing of air data instruments such as altimeters, airspeed indicators, machmeters, and the like requires an absolute pressure and a higher pressure differing from this absolute pressure by a regulated controlled amount. Thus, test instruments of this type include a static manifold which is connectable to the static pressure port of an aircraft and a pitot manifold which is connectable to the pitot inlet port of the aircraft. In the device of the aforesaid U.S. Patent 3,089,331, a first pump is provided to establish the pressure within the static manifold, with this pressure being either above or below ambient depending upon the conditions which are to be simulated. An electronic servo means which operates a control valve maintains pressure within the static manifold at the required level. A second pump is provided to establish a pressure in the pitot manifold which is referenced to, and is always greater than, the pressure within the static manifold though not necessarily greater than ambient. Additional electronic servo means operates another control valve to maintain a selected differential pressure between the static and pitot manifolds.

The instant invention provides a novel means whereby it is necessary to utilize only a single pump to create pressures in both the static and pitot manifolds. This is accomplished by providing a pressure supply valve which acts to store up the efflux of the pump and establish a pressure in a chamber of the valve which is at some arbitrary amount higher than the pressure within the pitot manifold. Should pressure within the chamber exceed this arbitrary amount a relief valve opens permitting the excess air to bleed to ambient. The pitot manifold is connected to the valve chamber through a needle valve which acts as a restriction to the flow of air from the chamber to the pitot manifold with the needle valve permitting only enough air to flow to cause the pitot pressure to increase at some desired minimum rate of change of air speed. When the pitot pressure rises so that the differential pressure between the pitot and static manifolds exceeds the desired pressure the differential servo pressure controller operates its associated control valve so that the latter opens just enough to maintain the desired differential pressure.

In the device of the aforesaid U.S. Patent No. 3,089,331 in order to establish a pressure within the static manifold greater than ambient not only was it necessary to adjust the altitude selector control but it was also necessary to adjust the position of a selector valve. Thus, it was necessary to make two adjustments.

The instant invention eliminates the necessity for the selector valve by utilizing an arrangement which includes the pressure suply valve previously mentioned and in addition utilizes an air supply control valve and a needle valve connected between the static manifold and the input to the pump.

Thus, when the static manifold is to be at a pressure near or greater than ambient this pressure is supplied from the air in the chamber of the pressure supply valve. When the static manifold is to be at a pressure below ambient there will be a flow of air from the static manifold through the needle valve to the input of the pump causing a pressure drop across this needle valve. This drop causes the air supply valve to admit some ambient air to the pump inlet. This air passes through the pump and through the control valve causing the pressure within the static manifold to rise above ambient by the amount of the drop across the needle valve. This arrangement makes it possible to obtain controlled pressures which are very close to ambient while in the prior art it was difficult to control the drop across the static control valve so that it was difficult to regulate pressures close to ambient whether these pressures were above or below ambient.

In the prior art devices of the type under consideration it has often been desirable to generate a pressure which is modulated about a fixed point. Typically this is done by operating a bellows through a crank pin drive bringing about a pressure change in accordance with the volume of change of the bellows. This has proved less than satisfactory in that the center value of the modulated pressure is subject to drift and the amplitude of the pressure modulation is difficult to establish. The drift of the center value of pressure is caused by leakage anywhere in the system, temperature changes in the trapped air, and changes in volume of the system under test. Modulation control is difficult since it depends upon the stroke of the bellows, the value of the center pressure, the volume of trapped air including the air in the system under test, and the geometry of the various restrictions to flow in the system.

The instant invention overcomes these difficulties by utilizing a static controller which includes a differential transformer whose output reaches a null when the static manifold is at a desired center value of pressure. In addition, the rotor of a synchro is continuously rotated to produce an output which is summed in phase or 180° out of phase with the output of the differential transformer. The combined outputs of the synchro and differential transformer produce a modulated signal which is amplified and utilized to operate the static control valve to produce the desired pressure modulation.

Accordingly, a primary object of this invention is to provide a novel construction for a pitot static tester.

Another object is to provide a tester of this type which requires but a single pump to establish both static and pitot pressures.

Still another object is to provide a novel pitot static tester having simplified controls for producing an accurately controlled pressure within the static manifold which is either above or below ambient.

A further object is to provide a novel means for producing pressure modulations.

A still further object is to provide a novel pressure modulating means including a differential transformer for establishing the center pressure value and a synchro device for producing the modulations about this center value.

These as well as other objects of the instant invention shall become readily apparent after reading the following description of the accompanying drawings in which:

FIGURE 2 is a schematic of a portion of a pitot static tester including means constructed in accordance with the teachings of the instant invention for modulating the pressures within the static manifold.

Figure 1:
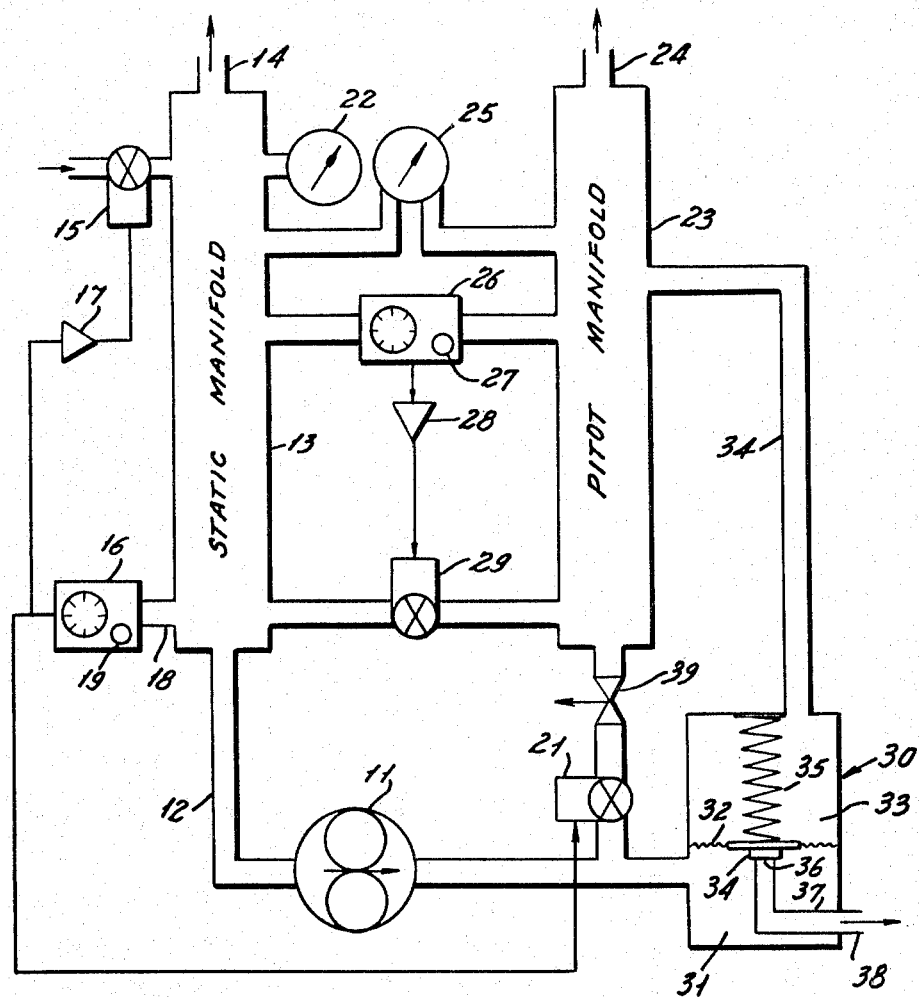
FIGURE 1 is a schematic of a pitot static tester constructed in accordance with the teachings of the instant invention and utilizing a single pump for establishing pressures within both the static and pitot manifolds.

Now referring to the figures and more particularly to FIGURE 1. It is noted that the pitot static tester illustrated in FIGURE 1 is essentially the tester illustrated in FIGURE 2 of the aforesaid U.S. Patent No. 3,089,331 except that the latter includes individual pumps for the static and pitot manifolds while in the instant invention only a single pump is required.

The intake of air pump 11 is connected through conduit 12 to static manifold 13 with the latter being connectable through conduit 14 and a suitable connector, well known to the art, to the static port of an aircraft or to an instrument on a test bench. Static manifold 13 is connected to ambient through normally closed static control valve 15. Static controller 16 acting through amplifier 17 controls the operation of static control valve 15. Controller 16 is connected through conduit 18 to static manifold 13 and compares the static pressure to pressure within a standard capsule (not shown) and the desired pressure established by the setting of control 19. For a reason to be hereinafter explained, controller 16 is also connected to normally closed pitot supply solenoid valve 21 for operation of the latter. The altitude setting corresponding to the pressure within static manifold 13 is read from the face of altimeter 22.

Pitot manifold 23 is connectable through conduit 24 and suitable fittings (not shown) to the pitot port of the system to be tested. Airspeed indicator 25 is connected between the static and pitot manifolds 13, 23 so as to produce a reading indicative of the differential pressure between these manifolds. Differential pressure controller 26 is connected between static and pitot manifolds 13, 23 and is constructed to compare the difference between pitot and static pressures with a pressure setting obtained by the manipulation of control 27. The amount by which this pressure difference differs from the setting of control 27 creates an error signal which is fed through amplifier 28 to open normally closed differential pressure control valve 29 connected between the static and pitot manifolds 13, 23. It is noted that when the differential pressure is too high control valve 29 is opened permitting enough air to bleed from pitot manifold 23 to static manifold 13 to establish the desired pressure difference.

The output of pump 11 is connected to chamber 31 of pressure supply valve 30. Valve 30 includes diaphragm 32 separating chamber 31 from another valve chamber 33 which is connected directly through conduit 34 to pitot manifold 23. Diaphragm 32 carries valve seat 34 which is biased by spring 35 within chamber 33 toward end 36 of conduit 37 whose other end 38 is connected to ambient. Conduit end 36 is disposed within chamber 31 and is closed by spring 35 which tends to hold valve seat 34 against conduit end 36. The output of pump 11 is connected through solenoid valve 21 in series with needle valve 39 to pitot manifold 23.

Pump 11 creates a partial vacuum in static manifold 13. This vacuum being controlled to a selected value by static control 16, amplifier 17 and static control valve 15. Valve spring 35 is chosen so that valve seat 34 closes conduit end 36 until such time as the pressure within valve chamber 31 exceeds, by predetermined amount, the pressure within pitot manifold 23. Typically this pressure is in the order of 15″ Hg. For higher pressures within chamber 31, diaphragm 32 is operated upwardly thereby raising valve seat 34 and permitting the excess air being delivered by pump 11 to be conducted through conduit 37 to ambient. Thus, it is seen that chamber 31 constitutes a reservoir for air at a pressure in excess of pitot pressure.

Air delivered by pump 11, when solenoid valve 21 is open, goes through a needle valve 39 to pitot manifold 23. Valve 39 acts as a constriction to the flow of air into pitot pressure to increase at some desired minimum rate of change of air speed. When the pressure within pitot manifold 23 rises so that the differential pressure between the static and pitot manifolds 13, 23 exceeds that set by control 27 of differential pressure control 26, controller 26 acting through amplifier 28 opens differential pressure control valve 29 just enough to maintain the desired differential pressure.

It is noted that when the set differential pressure is established, all air entering pitot manifold 23 must go through differential control valve 29 to static manifold 13. If at this time pump 11 is trying to raise the vacuum in static manifold 13, air from pitot manifold 23 causes a loss in the rate of evacuation. This is undesirable. Thus, pitot supply solenoid valve 21 is present. Solenoid valve 21 is deenergized, hence closed, whenever static control valve 15 is closed and hence is acting to produce higher vacuum at maximum rate within static manifold 13. With solenoid valve 21 closed the output of pump 11 is prevented from entering pitot manifold 23 thereby minimizing air flow through differential pressure control valve 29 so that the full capacity of pump 11 is made available for evacuating static manifold 13.

Figure 3:
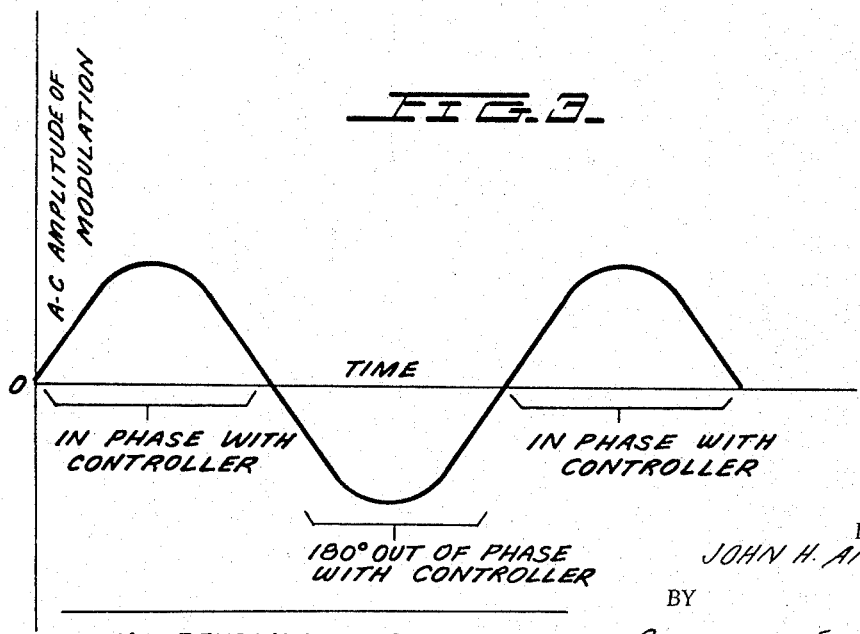
FIGURE 3 is a graph illustrating the output voltage of the synchro in the device of FIGURE 2.

Now referring more particularly to FIGURES 2 and 3. The elements of the FIGURE 2 schematic corresponding to similar or identical elements of the FIGURE 1 schematic are given identical reference numerals. FIGURE 2 discloses a novel means for modulating the pressure within static manifold 13.

Static controller 16 includes differential transformer 40 having E-shaped core 41 and armature 42. The position of core 41 is changed through the operation of knob 19 to establish the center value of pressure about which the modulations will take place. The central portion of armature 42 is mounted to one end of lever 43 which is mounted at a point intermediate the ends thereof to fixed pivot 44. Link 45 connects the other end of lever 43 to evacuated, flexible diaphragm capsule 46.

The primary winding 47 and two secondary windings 48, 49 of differential transformer 40 are mounted to core 41 with terminals 47a, 47b of primary 47 being connectable to an appropriate A.C. supply. As is well known to the art, the position of armature 42 relative to core 41 influences the coupling between primary 47 and secondaries 48, 49 thereby influencing the voltages induced in each of the secondaries 48, 49. Secondaries 48, 49 are connected in series opposing relationship from ground through resistor 50 to the input of amplifier 17.

As previously explained, pump 11 is continuously evacuating static manifold 13. When the vacuum within manifold 13 reaches the value set by knob 19, differential transformer 40 produces a null output since link 45 and lever 43 have appropriately positioned armature 42 relative to core 41. Further vacuum increase causes differential transformer 40 to produce an output whose amplitude is proportional to and of opposite phase to that which it produced at vacuums below the null. Thus, the combined output of secondaries 48, 49 produce a signal which is fed through resistor 50 to amplifier 17. The latter is sensitive only to the opposite phase so that this signal is amplified and energizes the proportional acting solenoid control valve 15 to let just enough air leak into static manifold 13 to maintain the vacuum at the set value.

To produce a sinusoidal modulation, switch 51 is closed thereby energizing rotor winding 52 of synchro 55 with the latter being continuously operated by synchro motor 53 acting through gear train 54. Terminal 52a of rotor winding 52 is connected through switch 51 to the movable arm 56 of potentiometer 57 while terminal 52b is connected to one end of potentiometer 57. Potentiometer 57 is connected across the A.C. supply which energizes the differential transformer primary winding 47. The voltage across the rotating rotor winding 52 induces voltages in the synchro stator windings 58–60 with windings 58 and 59 being connected in series from ground through resistor 61 to amplifier 17. Additional resistor 62 is connected from ground to amplifier 17.

Assuming that controller 16 is holding the vacuum within static manifold 13 at some set value, there will be a small voltage from windings 48, 49 which is amplified and acts to hold valve 15 open. Now as a voltage from synchro 55 is introduced this voltage will immediately open or close valve 15 depending upon the phase of the synchro output voltage at the time it is introduced (see FIGURE 3 for synchro output voltage). The pressure within static manifold 13 will change causing the output of control windings 48, 49 to change in a direction to cancel the effect of the voltage introduced by synchro 55. The voltage from controller 16 varies linearly with pressure over small excursions so that changes in pressure will be proportional to changes in voltage from synchro 55 thereby producing a sinusoidal pressure variation about the pressure existing before the synchro voltage was introduced.

The amplitude of modulation is determined by the values of resistors 50, 61 and 62 and by the setting of potentiometer wiper arm 56. It is to be understood that the latter will have a calibrated dial operated in unison therewith. The output of the two wires of the synchro stator is a voltage of supply frequency which is modulated in a sinusoidal manner.

It is noted that not only controlled oscillations of sinusoidal form but any pattern of pressure change (within the proportional signal output range of the controller) can be affected by introducing an A.C. voltage of suitable amplitude either in phase or 180° out of phase with the control output. For example, the outputs of an analog computer which are voltages simulating altitude and air speed of a certain flight maneuver may be inserted resulting in the simulated altitude and air speed changes of this maneuver being generated by the tester. In addition, a uniformly changing voltage can be introduced to give a uniform rate of change of static or pitot pressure. A variable speed gear train or several different gear trains and synchros may be used to obtain more than one frequency of modulation.

It is also noted that valve 15 is a proportional valve rather than a valve of the type which is either closed or fully open. As explained in detail in the aforesaid U.S. Patent No. 3,089,331, the extent to which valve 15 opens is controlled by the magnitude of the error signal. The utilization of a proportional valve, rather than an on-off valve, enables the device of the instant invention to have a rapid, smooth response and permits multiple forms of modulation to be imposed on the correction signal.

Figure 4:
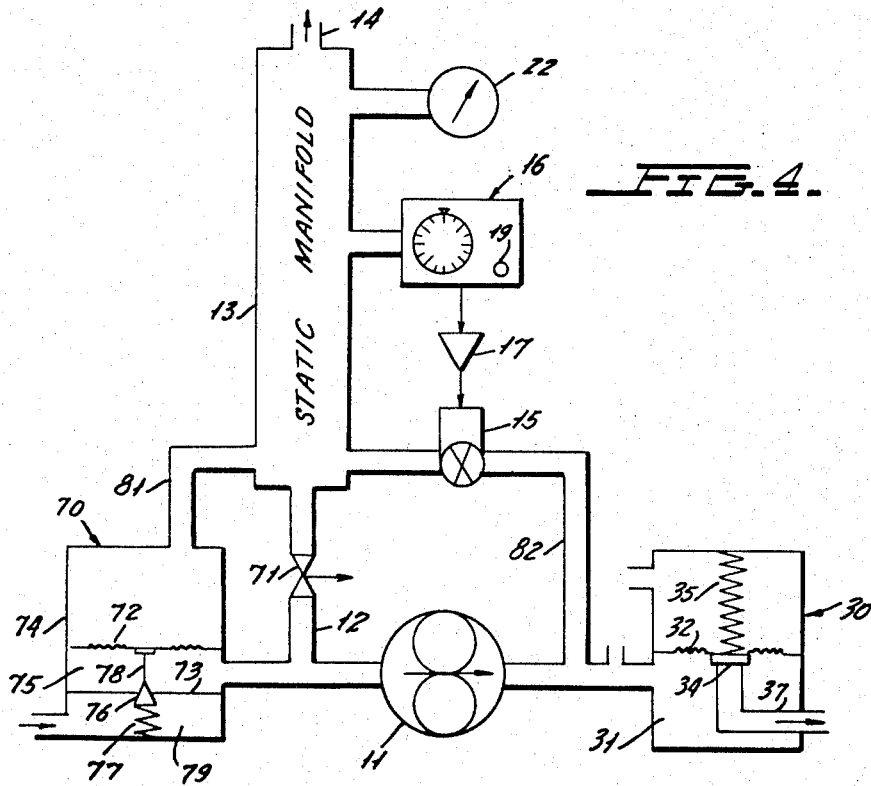
FIGURE 4 is a schematic illustrating a portion of a pitot static tester including means for establishing pressures either above or below ambient within the static manifold by setting merely one control.

Now referring more particularly to FIGURE 4 which illustrates a modification of the constructions shown in FIGURES 1 and 2. With the modification illustrated in FIGURE 4, it is possible to obtain control pressures either above or below ambient in the static manifold 13 by merely manipulating the single adjustment control 19 of static controller 16. This is accomplished by providing needle valve 71 in conduit 12 which connects the intake of pump 11 to static manifold 13. Further, air supply control valve 70 is provided between static manifold 13 and the intake of pump 11.

Air supply control valve 70 includes diaphragm 72 and partition 73 which cooperate to define chamber 75 within valve housing 74. Chamber 75 is in direct communication with the intake of pump 11. Partition 73 is provided with a central opening which is normally closed by valve seat 76 biased to closed position by spring 77. Typically, spring 77 is chosen such that its force is overcome when there is a pressure of from one to two inches of mercury acting upon diaphragm 72. Rigid link 78 connects valve seat 76 to diaphragm 72 so that when the latter is deflected downward, valve seat 76 will be moved downward against the force of biasing spring 77 and the central aperture of partition 73 will be open. Under these circumstances valve chamber 75 is connected to bottom valve chamber 79 which is at ambient. The portion of valve housing 74 above diaphragm 72 is connected through conduit 81 directly to static manifold 13.

It is noted that the pressure within chamber 31 of pressure supply valve 30 is above pitot pressure which is always above static pressure or sufficiently above ambient pressure so that pressure within chamber 31 will be above static pressure even when static pressure is somewhat above ambient. In the embodiment of FIGURE 4, static control valve 15 instead of being connected from static manifold 13 to ambient is connected from static manifold 13 by conduit 82 to chamber 31.

When static controller 16 is set to establish a pressure below ambient this pressure can be established in the normal manner and regulated by operating static control valve 15 to admit controlled amounts of air from pressure supply valve chamber 31 to static manifold 13. However, if this air is to raise the pressure in the static manifold 13 more air must be lead in through static control valve 15 then is being drawn out by pump 11. If air supply control valve 70 were not present, chamber 31 could supply more air than was being drawn from static manifold 13.

So long as there is a flow of air evacuating static manifold 13 there will be a pressure drop across needle valve 71 so that the pressure within valve chamber 75 is less than that within static manifold 13. Under these conditions diaphragm 72 is moved downward moving valve seat 76 downward thereby opening the valve. This permits a certain amount of ambient air to enter pump 11 so long as pump 11 is sucking a vacuum which is below ambient pressure.

In the situation where controller 16 is acting to establish a static pressure above ambient, static control valve 15 opens and admits a copius supply of air into static manifold 13. Pump 11 in evacuating this air through needle valve 71 causes a pressure drop across this needle valve 71 thereby enabling air supply control valve 70 to open and connect the intake of pump 11 to ambient. Under these circumstances the static pump end of needle valve 71 is at ambient and the static manifold end of valve 71 is above ambient, hence static manifold pressure is above ambient. In this manner static pressure may be controlled at a value above ambient.

Thus, this invention provides a novel construction for a pitot static tester which includes novel means for obtaining controlled modulation of air pressure about a fixed reference. The static controller also includes novel means for obtaining and regulating both static pressure and pitot pressure by utilizing only a single pump and further provides novel means for producing a static pressure which is either above or below ambient pressure by merely adjusting a single control. It is obvious that any desired combination of these features may be combined in a single tester.

Although there has been described a preferred embodiment of this novel invention, many variations and modifications will now be apparent to those skilled in the art.

Therefore, this invention is to be limited, not by the specific disclosure herein, but only by the appending claims.

The embodiments of the invention in which an exclusive privilege or property is claimed are defined as follows:

1. A device of the class described comprising a first and a second manifold; pump means for establishing a first and a second pressure in said first and said second manifolds, respectively, with said second pressure exceeding said first pressure; first servo means for maintaining said first pressure referenced to a standard; second servo means for maintaining said second pressure referenced to said first pressure; said pump means including an intake and an output; first means connecting said intake to said first manifold and second means connecting said output to said second manifold; a valve including a chamber connected to said output by said second means and constructed to permit a third pressure exceeding said second pressure and referenced thereto to build up in said chamber.

2. The device of claim 1 in which the second means includes a constricting means positioned between said second manifold and a common function connecting said output to said chamber for regulating maximum flow rate from said pump means to said second manifold.

3. A device of the class described comprising a first and a second manifold; pump means for establishing a first and a second pressure in said first and said second manifolds, respectively; first servo means for maintaining said first pressure referenced to a standard; second servo means for maintaining said second pressure referenced to said first pressure; said pump means including an intake and an output; first means connecting said intake to said first manifold and second means connecting said output to said second manifold; a valve connected to said output by said second means and constructed to permit a third pressure to build up therein which is referenced to said second pressure; said second pressure exceeding said first pressure and said third pressure exceeding said second pressure; said second means also including a supply valve positioned between said valve and said second manifold; an operative connection from said first servo means to said supply valve to control operation of the latter such that the supply valve is closed whenever said first servo means is operating to lower pressure in said first manifold.

4. The device of claim 3 in which the second pressure exceeds the first pressure and the third pressure exceeds the second pressure.

5. A device of the class described comprising a manifold; pump means for establishing a pressure within said manifold; a servo means for maintaining said pressure at a predetermined level; said pump means including an intake and an output; a constricting means connected between said manifold and said input; and valve means responsive to a pressure drop existing across said constricting means for connecting said intake to ambient when pressure at said intake is in excess of a predetermined magnitude less than pressure in said manifold.

6. The device of claim 5 in which the valve means comprises a chamber connected to said intake; said chamber partially defined by a first wall and a second wall; said first wall comprising a movable portion subjected to said pressure in said manifold; said second wall including an aperture, a valve member for normally closing said aperture; means connecting said movable portion to said valve member whereby said aperture is opened whenever the pressure within said chamber is at least a predetermined magnitude below pressure in said manifold.

7. The device of claim 5 also comprising a connecting means between the output of said pump to said manifold; said connecting means comprising a control valve constituting a portion of said servo means.

8. The device of claim 6 also comprising a connecting means between the output of said pump to said manifold; said connecting means comprising a control valve constituting a portion of said servo means.

References Cited
UNITED STATES PATENTS

| | | | |
|---|---|---|---|
| 3,089,331 | 5/1963 | Sharko et al. | 73—4 |
| 3,263,482 | 8/1966 | Shank | 73—4 |

LOUIS R. PRINCE, *Primary Examiner.*

S. C. SWISHER, *Assistant Examiner.*